US012221326B2

(12) United States Patent
Reesing

(10) Patent No.: US 12,221,326 B2
(45) Date of Patent: Feb. 11, 2025

(54) CRANE CONTROL SYSTEM FOR AUTOMATED ACTUATION OF CRANE POSITIONERS

(71) Applicant: MANITOWOC CRANE GROUP FRANCE SAS, Dardilly (FR)

(72) Inventor: Jann Reesing, Butjadingen (DE)

(73) Assignee: Manitowoc Crane Group France SAS, Dardilly (FR)

( * ) Notice: Subject to any disclaimer, the term of this patent is extended or adjusted under 35 U.S.C. 154(b) by 459 days.

(21) Appl. No.: 17/403,433

(22) Filed: Aug. 16, 2021

(65) Prior Publication Data

US 2022/0055871 A1 Feb. 24, 2022

(30) Foreign Application Priority Data

Aug. 19, 2020 (DE) ........................ 202020104793.0

(51) Int. Cl.
*B66C 13/18* (2006.01)

(52) U.S. Cl.
CPC .................................... *B66C 13/18* (2013.01)

(58) Field of Classification Search
None
See application file for complete search history.

(56) References Cited

U.S. PATENT DOCUMENTS

| | | | | |
|---|---|---|---|---|
| 2016/0201408 | A1* | 7/2016 | Little | E21B 19/14 414/730 |
| 2017/0029252 | A1* | 2/2017 | Deimer | B66C 13/44 |
| 2022/0219953 | A1* | 7/2022 | Tanii | B66C 13/48 |

FOREIGN PATENT DOCUMENTS

| | | | |
|---|---|---|---|
| DE | 102016004249 | A1 | 10/2017 |
| DE | 102016015388 | A1 | 6/2018 |
| EP | 3099618 | B1 | 12/2016 |
| EP | 3553015 | A1 | 10/2019 |
| EP | 3556709 | A1 | 10/2019 |

OTHER PUBLICATIONS

Search report dated May 12, 2021 issued by the German Patent Office (DPMA) in connection with corresponding German Patent Application 20 2020 104 793.0.

* cited by examiner

*Primary Examiner* — James J Lee
*Assistant Examiner* — Jonathan E Reinert
(74) *Attorney, Agent, or Firm* — Cook Alex Ltd.

(57) ABSTRACT

A crane control system for actuating positioners of a crane is configured to receive target position data which describe a predefined target position of at least one positioner, in particular at least one crane superstructure positioner; receive clearance data which describe a user input for clearing a movement of the at least one positioner into the predefined target position; and output control data which describe control signals to be output to the at least one positioner in order to move the at least one positioner into the predefined target position.

10 Claims, 1 Drawing Sheet

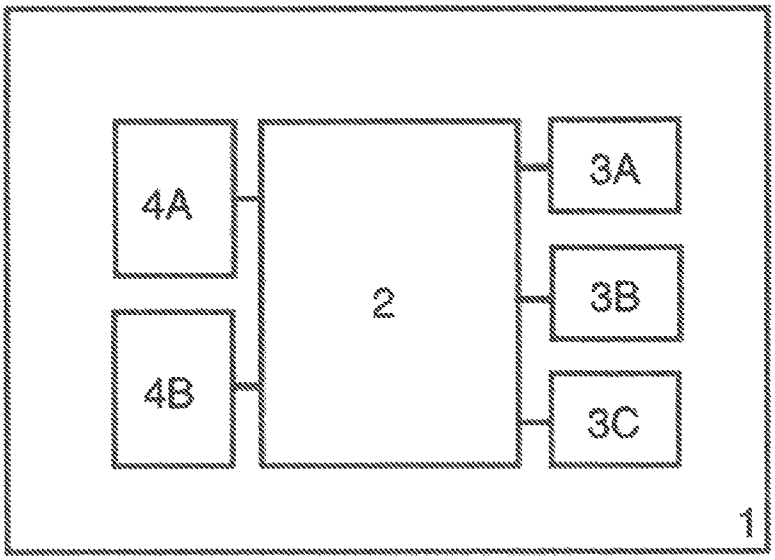
4A
4B
2
3A
3B
3C
1

CRANE CONTROL SYSTEM FOR AUTOMATED ACTUATION OF CRANE POSITIONERS

FIELD

The present invention relates to a crane control system which actuates one or more positioners of a crane in such a way that the positioner(s) in question is/are moved into a desired target position without this requiring the crane operator to input corresponding control commands.

BACKGROUND

Cranes in general and mobile cranes in particular comprise a multitude of positioners in order to perform necessary crane movements, said positioners being connected via a crane control system to an operating device for the crane operator. Control commands input by the crane operator via the operating device are thus converted by the crane control system into corresponding signals for the positioners.

At the beginning and end of a deployment, for example, the same positioning movements always have to be performed in order to convey the crane from a transport configuration to an operational configuration and/or from an operational configuration back to the transport configuration. Once the crane has arrived at the site of deployment, the hook block is firstly released from the front hitch on the undercarriage, whereupon the telescopic jib is raised out of the bearing bracket on the undercarriage by luffing it into place. Only then can the hook block be moved into a desired position above a load to be lifted by pivoting and telescopically adjusting the jib, wherein the lifting cable and/or hook block has to be tracked accordingly. At the end of the deployment, these positioning movements have to be performed in reverse order in order to prepare the crane for road transport.

Both the strict adherence to predetermined sequences of control movements and constantly recurring positioning movements into predetermined positions represent significant demands on the crane operator.

It is the object of the present invention to relieve the crane operator in this respect.

SUMMARY

The crane control system in accordance with the invention for actuating positioners of a crane is accordingly configured to perform the following functions:

- receiving target position data which describe a predefined target position of at least one positioner, in particular at least one crane superstructure positioner;
- receiving clearance data which describe a user input for clearing a movement of the at least one positioner into the predefined target position;
- outputting control data which describe control signals to be output to the at least one positioner in order to move the at least one positioner into the predefined target position.

Unlike known crane control systems, which convert the control commands input by the crane operator via an operating device into a corresponding actuation and/or control signals for the positioners in question, the crane control system in accordance with the invention only receives from the crane operator an input by which the crane operator clears the crane control system to output control signals to one or more positioners, such that the latter move to a predefined target position.

In yet other words, the crane control system in accordance with the invention receives from the at least one positioner a target position to be moved to, before it receives clearance from the crane driver to cause the corresponding positioners, by means of control signals, to move to the desired target position.

Within the framework of the present invention, it is in principle just as conceivable to actuate positioners of a crane superstructure as it is to actuate positioners of a crane undercarriage. In the latter case, support cylinders and/or sliding cylinders of a crane support could in particular then be considered. In one specific embodiment, a desired outrigger member position could then be preselected via a user input, to which the sliding cylinders of the outrigger members then move. In this way, the support cylinders can then automatically be extended and the vehicle levelled. Clearance for this could for example be given by a sustained keystroke on a keypad.

In the case of cable drums, hydraulic motors and similar positioners which repeatedly pass through individual positions, the term "target position" used here is to be understood to mean that the elements influenced by this, such as for example cables or volumes of liquid, are activated in a desired way. In the case of cable drums, this is not to be understood to mean the absolute angular position of the cable drum itself but rather the desired wound or unwound length of cable.

In accordance with one embodiment of the present invention, the transport position of a crane jib which is to be provided for road transport defines a target position of at least one positioner. For this and similar cases, the target position and/or the data describing the target position can be permanently stored in the crane control system, for example on a non-volatile storage medium.

In accordance with another embodiment, a ready-for-operation position of the crane jib defines a target position of at least one positioner. While the target positions needed for such a ready-for-operation position of the crane jib and/or the data describing said target positions can likewise be permanently stored in the crane control system, it is also conceivable in this respect for the crane control system to provide the option of user-defined target positions for one or more positioners. Different preferred positions of the crane jib can then for example be defined by multiple crane operators as a preferred ready-for-operation position into which the crane jib is to be automatically moved at the beginning of deployment.

In accordance with another embodiment of the present invention, the crane control system thus defines a target position of at least one positioner on the basis of a user input which is for example input via an operating device. It is conceivable for the crane operator to firstly input the desired values for the luffing angle, the pivoting angle, the telescopic length and/or the lifting cable length via a keypad or similar operating elements. Conversely, the current position of at least one positioner can be defined as the target position, for example by the crane operator pressing a button. A particular jib position can then be exactly moved to again at a later time.

It is also conceivable for the crane control system to enable:

- a user input for modifying the target position, wherein the modified position is in particular defined as the new target position; and/or a user input for interrupting the movement towards the target position, wherein in particular in order to resume the movement towards the target position, the at least one positioner is moved into its position at the time of interruption.

In the first case, the crane operator can readjust a previously defined target position, so to speak, which is particularly advantageous when the environment of the crane changes and/or further develops during deployment. In the second case, it is possible to interrupt the predefined movement towards the target position and to resume it at any later time.

While it is in principle conceivable for a single clearance to cause the desired positioners to be moved fully automatically, so to speak, into a target position, for example once the crane operator gives clearance by means of briefly pressing a button, one preferred embodiment of the present invention envisages the crane control system outputting the control data only for as long as the user activates an operating device. For this purpose, it is conceivable for an operating element to have to be permanently activated, for example for a control stick to have to be permanently pivoted in an arbitrary or predefined direction, in order to perform the positioning movements. In accordance with the essence of the present invention, the activating direction of the control element need not necessarily match the direction of the positioning movement to be completed by the positioner. In one simple example, the crane operator can permanently "pull" on a control stick, wherein the crane jib moves towards the desired target position for as long as the crane operator continues to pull on the control stick. As soon as the operating element and/or control stick is released, the crane control system ceases the positioning movements.

It is then in particular conceivable for the operating device to be activated by the user in order to directly actuate at least one additional positioner, i.e. while one or more first positioners are deliberately controlled by the crane operator in a conventional way via the operating device, at least one second positioner is automatically actuated in parallel by the crane control system in the way described above, i.e. without being specifically controlled by the crane operator. The crane operator can for example actuate the telescopic cylinder in a conventional way via the operating device in order to telescopically retract or extend the jib, while the lifting cable winch is automatically actuated by the crane control system in such a way that the lifting cable is unwound and/or wound in accordance with the length of the jib. The "target position" for the lifting winch can accordingly be defined by the length of the lifting cable which is needed in order to keep the hook block at a predefined distance from the jib head. The crane control system can also update a target position of at least one positioner, continuously or at predetermined time intervals, wherein sagging of the crane jib and/or the position of the load can in particular be taken into account. It can for example be desirable for the raised load to be kept at a constant lifting height relative to the ground and/or the crane undercarriage while telescopically adjusting and/or luffing the jib. In very general terms, the current target position can depend solely on the position of the positioners being directly actuated by the crane operator. The target position of the lifting winch can for example depend on the position of the luffing cylinder and/or the telescopic length. Since, at a constant load, the sagging of the crane jib increases as the luffing angle relative to the horizontal decreases or equally as the telescopic length increases, these values can be incorporated into calculating the updated target position of the lifting cable winch, in order to keep the lifting height of the load constant when actuating the luffing cylinder and/or the telescopic cylinder.

In accordance with another embodiment of the present invention, it is conceivable for the crane control system to record the activation of at least one positioner, in particular an activation sequence for multiple positioners, over a time interval. The recorded positioner activations can then be converted by the crane control system into corresponding control signals at a later time, in order to activate the positioner or positioners again in an identical way. It is thus possible to make one or more positioners perform repetitive positioning movements or even entire sequences of positioning movements automatically while the crane is being deployed, without this needing to be specifically controlled by the crane operator.

The present invention also relates to a crane, in particular a mobile crane, which comprises a crane control system in accordance with one of the embodiments described above.

BRIEF DESCRIPTION OF THE DRAWING

A preferred embodiment of the present invention is explained in more detail below with reference to the accompanying FIGURE. The invention can comprise any of the features described here, individually and in any expedient combination. There is shown:

FIG. 1 a schematic representation of a mobile crane comprising the crane control system in accordance with the invention.

DESCRIPTION

FIG. 1 shows a block diagram of a mobile crane 1 which comprises a crane control system 2 in accordance with the present invention. The crane control system 2 is connected on the one hand to a keypad 4A and a control stick 4B which together form a human-machine interface 4 of the mobile crane 1. The crane control system 2 is also connected to multiple positioners 3A, 3B, 3C of the mobile crane 1, wherein the block 3A represents a telescopic cylinder, the block 3B represents a luffing cylinder, and the block 3C represents the lifting mechanism of the mobile crane 1.

In a first aspect, the crane control system 2 enables the crane 1 to be automatically erected and dismantled. Once it has arrived at the site of deployment, the telescopic jib of the crane 1 can be moved from a transport position, in which it is supported on the crane undercarriage, to a ready-for-operation position exhibiting predefined values for the luffing angle, the pivoting angle and the telescopic length by the crane operator merely "pulling" on the control stick 4B. As soon as the control stick 4B is released by the crane operator, this installing movement of the crane jib ceases. The predefined values for the luffing angle, the pivoting angle and the telescopic length can for example be stored in a non-volatile memory of the crane control system 2, or can also be input beforehand by the crane operator via the keypad 4A. The installing movement can be defined such that the crane jib is firstly raised out of its bearing bracket on the crane undercarriage by activating the luffing cylinder 3B and moved into a predefined luffing angle. The crane control system 2 can then actuate a slewing mechanism (not indicated) of the crane superstructure, which moves the crane jib into a predefined pivoting angle. The crane control system can then activate the telescopic cylinder 3A and an associated locking head in such a way that the crane jib is telescopically extended to a predefined telescopic length. During all these positioning movements, the crane control systems 2 actuates the lifting mechanism 3C in such a way that the crane hook block is kept in a constant position relative to the jib head, wherein positioning movements of the telescopic cylinder 3A, the luffing cylinder 3B and the slewing mechanism (not shown in FIG. 1) can also be performed at least partially in parallel.

In order to dismantle the crane from any given position of the crane jib to a transport position in which it is supported on the crane undercarriage, it is in turn merely necessary for the crane operator to pull on the control stick 4B, such that the crane control system 2 actuates the respective positioners 3A, 3B and 3C in such a way that they assume the position values for the transport position which are stored in the non-volatile memory.

In accordance with another aspect, the crane control system enables a crane operator to initiate a recording mode by means of the keypad 4A, such that the positioner movements effected by the crane operator via the control stick 4B are recorded. At a later time, the crane operator can cause the crane control system 2 to repeat the previously recorded positioner movements—starting from a recorded starting point—in a playback mode which is for example initiated by an input on the keypad 4A. The crane operator is thus relieved of the task of specifically controlling recurring positioner movements.

In another aspect of the crane control system 2 in accordance with the invention, the crane operator can, via the keypad 4A, input a desired target lifting height of the load attached to the jib or also define a currently prevailing load lifting height as the target lifting height. While the crane operator then effects any given positioning movements of the telescopic cylinder 3A and the luffing cylinder 3B, the crane control system 2 constantly adjusts the crane hook block by automatically activating the lifting mechanism 3C such that the previously determined height of the load relative to the ground and/or crane undercarriage remains constant.

The invention claimed is:

1. A crane control system for actuating positioners of a crane, wherein the crane control system is configured to perform the following functions:

receiving target position data which describes a predefined target position of at least one positioner;

receiving clearance data which describes a user input for clearing a movement of the at least one positioner into the predefined target position;

outputting control data which describes control signals to be output to the at least one positioner in order to move the at least one positioner into the predefined target position, and converting a control command input by a user activating an operating device into an actuation signal to actuate at least one additional positioner, such that the at least one additional positioner is controlled by the user via the operating device, wherein the crane control system outputs the control data for as long as the user activates the operating device, such that the at least one positioner is automatically actuated by the crane control system to move according to the control signals in order to automatically move into the predefined target position, in parallel with the user controlling the at least one additional positioner by activating the operating device, wherein the at least one a positioner is a telescopic cylinder, luffing cylinder or lifting mechanism, and the at least one additional positioner is another of the telescopic cylinder, luffing cylinder and lifting mechanism.

2. The crane control system according to claim 1, wherein a transport position of a crane jib defines a target position of at least one positioner.

3. The crane control system according to claim 1, wherein a ready-for-operation position of a crane jib defines a target position of at least one positioner.

4. The crane control system according to claim 1, wherein at least one user input via an operating device defines a target position of at least one positioner.

5. The crane control system according to claim 4, wherein the at least one user input defines a current position of the least one positioner as the target position.

6. The crane control system according to claim 1, wherein the crane control system enables:

a user input for modifying the predefined target position, wherein a modified predefined target position is defined as a new predefined target position; and/or a user input for interrupting the movement towards the predefined target position, wherein in order to resume the movement towards the predefined target position, at least one positioner is moved into its position at the time of interruption.

7. The crane control system according to claim 1, wherein the crane control system updates the predefined target position of at least one positioner, continuously or at time intervals, taking into account sagging of a crane jib and/or a position of a load.

8. The crane control system according to claim 1, wherein the crane control system is configured to record an activation of at least one positioner, over a time interval, in order to output control signals corresponding to a recording to the at least one positioner at a later time.

9. The crane control system according to claim 8, wherein the crane control system is configured to record an activation sequence for multiple positioners.

10. A crane comprising a crane control system according to claim 1.

* * * * *